Aug. 29, 1967 G. N. JORGENSEN 3,339,124
TRIM PANEL, DOOR, AND CLAMP ASSEMBLIES FOR ELECTRICAL
PANELBOARDS AND TELEPHONE CABINETS
Filed March 8, 1966 3 Sheets-Sheet 3
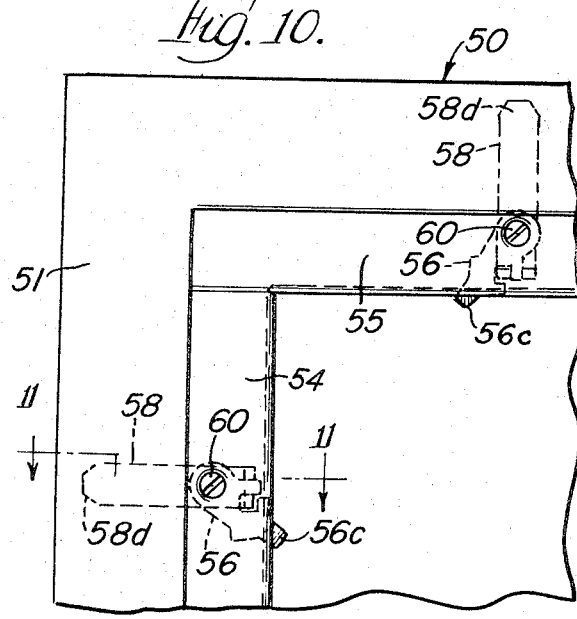
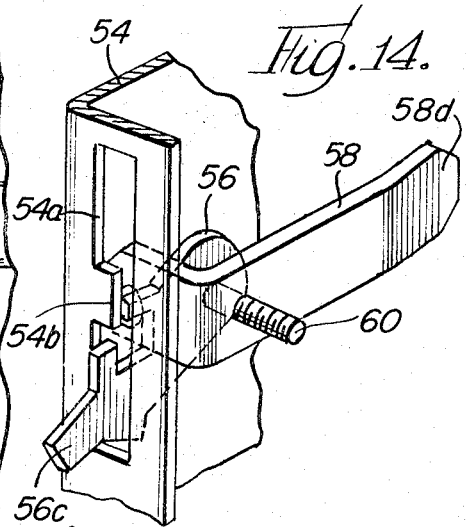
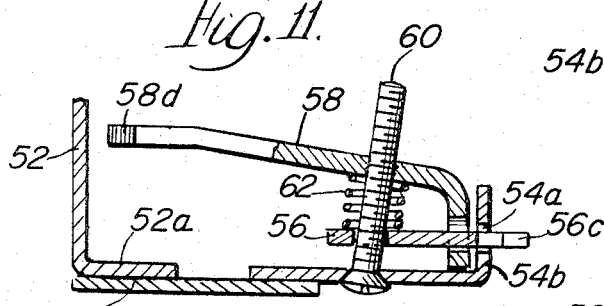
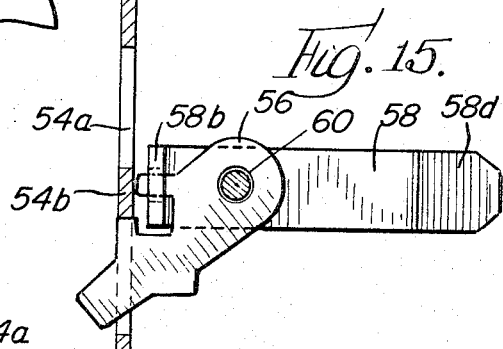
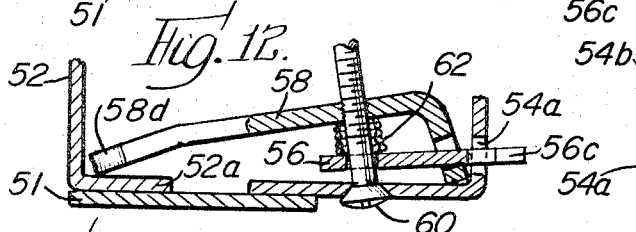
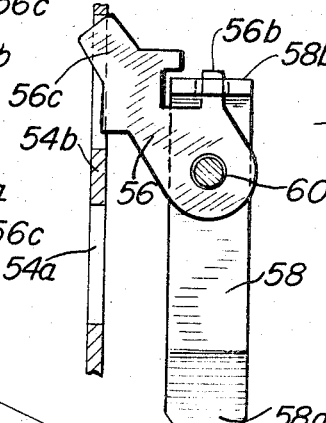
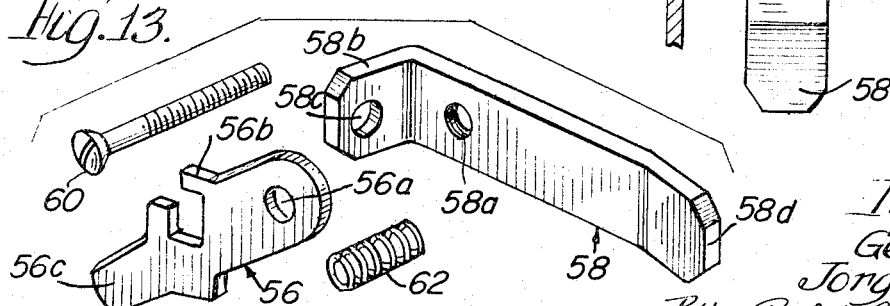
Inventor
George N. Jorgensen
By Paul J. Rose
Atty.

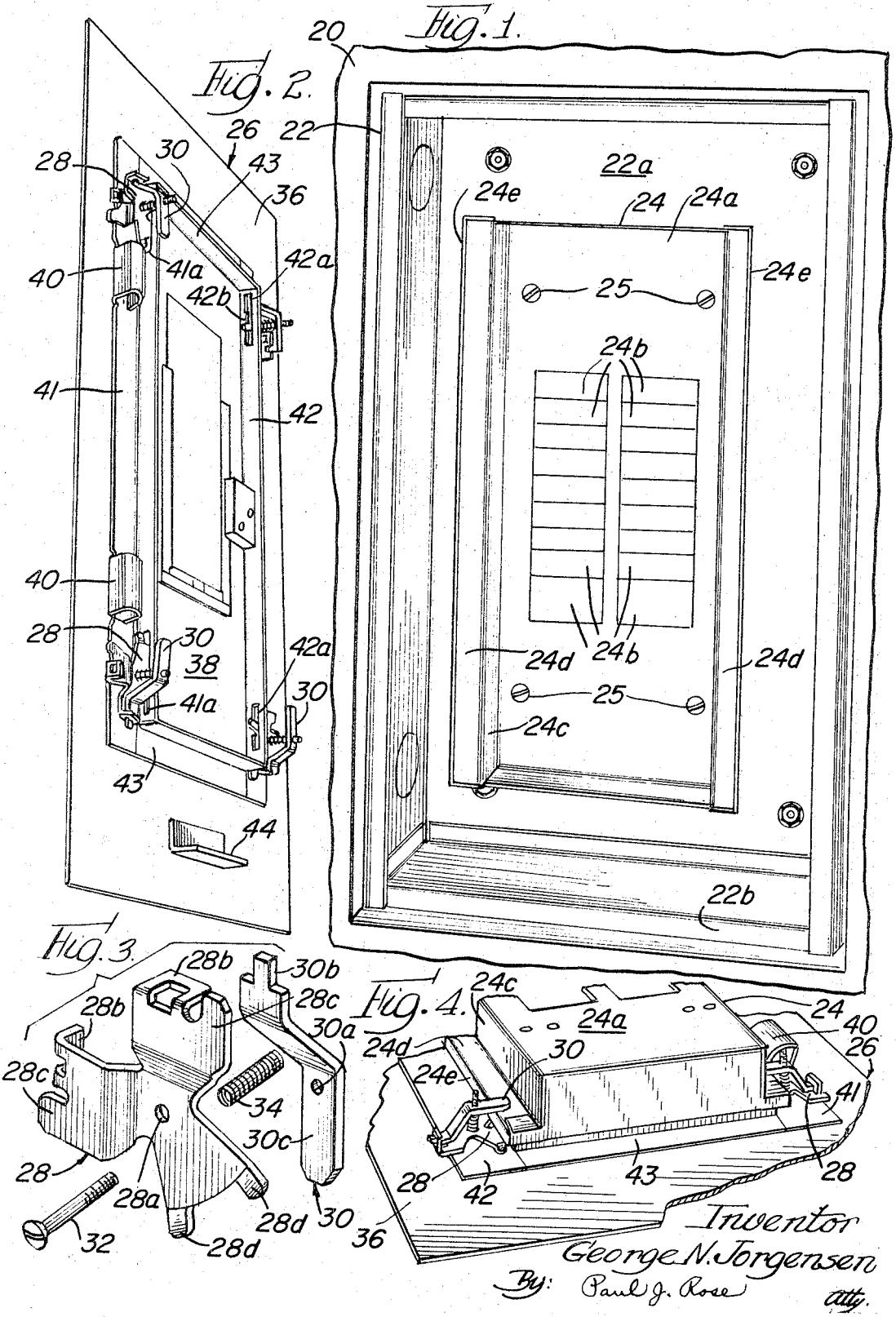

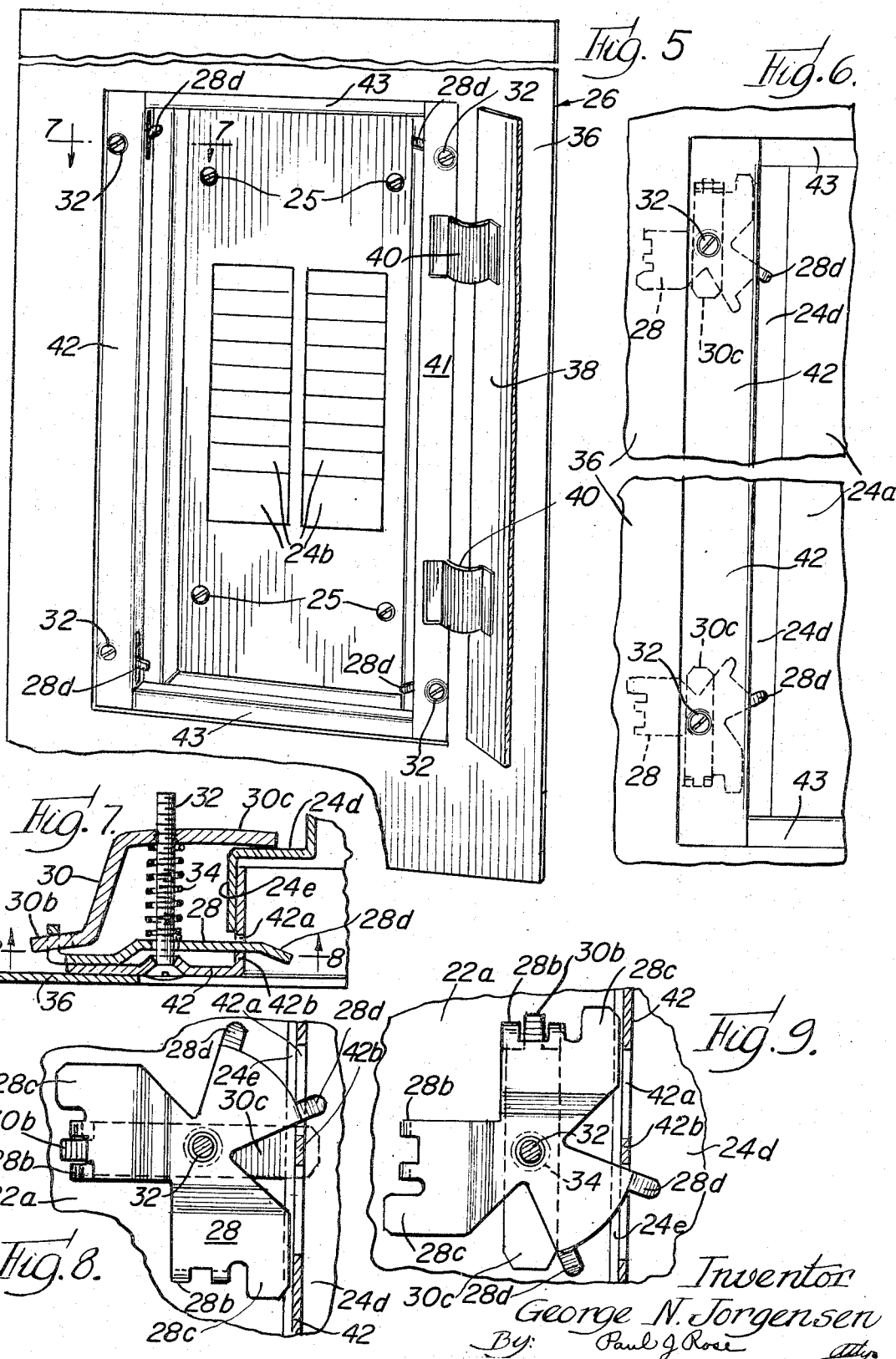

United States Patent Office 3,339,124
Patented Aug. 29, 1967

3,339,124
TRIM PANEL, DOOR, AND CLAMP ASSEMBLIES FOR ELECTRICAL PANELBOARDS AND TELEPHONE CABINETS
George N. Jorgensen, Lexington, Ky., assignor to Square D Company, Park Ridge, Ill., a corporation of Michigan
Filed Mar. 8, 1966, Ser. No. 532,706
6 Claims. (Cl. 317—120)

ABSTRACT OF THE DISCLOSURE

A front trim panel, door, and clamp assembly for open-front boxes of electrical panelboards or telephone terminal cabinets, each of the clamping means, including a screw thereof, normally being completely concealed, and a body of each of the clamping means having handle and indicating portions for moving a clamp alternatively to clamping and unclamping positions and indicating the position.

---

The object of the invention is to provide improved clamps for clamping exterior trim and door assemblies for electrical panelboards and telephone cabinets in position with respect to the open-front boxes thereof, the clamps being invisible when the doors are closed and having indicating portions showing whether they are in clamping or in an unclamping or installing position when the doors are open.

FIG. 1 is a front perspective view of an open-front box of an electrical panelboard recessed within a wall, and an interior trim panel constructed in accordance with the invention mounted in the box;

FIG. 2 is a rear perspective view of an exterior trim and door assembly constructed in accordance with the invention;

FIG. 3 is an exploded perspective view of one of the clamping assemblies of the exterior trim and door assembly of FIG. 2;

FIG. 4 is a fragmentary rear perspective view of the exterior trim and door assembly of FIG. 2 clamped to the interior trim panel of FIG. 1, the interior trim panel being removed from the box;

FIG. 5 is a fragmentary front perspective view of the exterior trim and door assembly of FIG. 2 clamped to the interior trim panel of FIG. 1 and closing the open-front of the box, the door of the assembly being open;

FIG. 6 is a fragmentary front elevational view of portions of FIG. 5, but showing the upper left and lower left clamping assemblies in an unclamping position;

FIG. 7 is a fragmentary sectional view taken generally along the line 7—7 of FIG. 5 and showing the upper left clamping assembly in clamping position;

FIG. 8 is a fragmentary sectional view taken generally along the line 8—8 of FIG. 7;

FIG. 9 is a view similar to FIG. 8, but showing the clamping assembly in installing position;

FIG. 10 is a fragmentary front elevational view of a telephone cabinet having an exterior trim and door assembly constructed in accordance with the invention, the door being omitted for simplicity and clamping assemblies of upper and left-hand side portions of the exterior trim and door assembly being shown;

FIG. 11 is a fragmentary sectional view taken generally along the line 11—11 of FIG. 10, but showing one of the clamping assemblies in an unclamping position.

FIG. 12 is a view similar to FIG. 11, but showing the clamping assembly in a clamping position;

FIG. 13 is an exploded perspective view of one of the clamping assemblies of FIG. 10;

FIG. 14 is a fragmentary rear perspective view of the exterior trim and door assembly of FIG. 10;

FIG. 15 is a fragmentary front elevational sectional view of a clamping assembly of the right-hand side portion of the exterior trim and door assembly of FIG. 10; and FIG. 16 is a view similar to FIG. 15, but showing the clamping assembly in an installing position.

FIG. 1 shows a portion of a wall 20 having a box 22 of an electrical panelboard recessed therein. An interior trim panel 24 is mounted in any suitable manner, as by four screws 25, on a mounting pan (not shown), the mounting pan being adjustably mounted in any suitable manner on a rear wall portion 22a of the box 22 for movement toward and away therefrom. A main body portion 24a of the interior trim panel 24 is provided with two rows of knockout portions 24b which are removable so that casing portions and operating handles of circuit breakers (not shown) mounted on the mounting pan may protrude through the trim panel. Further, the interior trim panel 24 is provided with a pair of opposed frontwardly extending side portions 24c only the left one of which is clearly shown in FIG. 1. A pair of laterally extending portions 24d extend away from each other respectively from the front edges of the side portions 24c generally parallel to the main body portion 24a. A pair of guide portions 24e extend frontwardly respectively from the outer edges of the lateral portions 24d.

An exterior trim and door assembly 26 (FIG. 2) having four clamping assemblies constructed in accordance with the invention mounted thereon is adapted to be clamped by the four clamping assemblies to the interior trim panel 24 as best shown in FIG. 4, the interior trim panel 24 in FIG. 4 being removed from the mounting pan and from the box 22 for purposes of illustration, and one of the clamping assemblies of the exterior trim and door assembly 26 being best shown in an exploded perspective view in FIG. 3.

Each clamping assembly includes a body 28, a clamp 30, a screw 32, and a spring 34, the body 28 having a hole 28a for loosely receiving the screw 32 and the clamp 30 having a threaded hole 30a into which the screw 32 may be threaded with the spring 34 disposed on the screw 32 and between the body 28 and clamp 30.

The exterior trim and door assembly 26 includes an exterior trim panel 36 having a door opening closable by a door 38 hinged to the trim panel 36 by a pair of hinges 40 constructed as disclosed in U.S. Patent No. 3,202,881 to which reference may be had for further details. Welded or otherwise secured to the inner surface of trim panel 36 in surrounding relationship to the door opening thereof are a pair of right and left angle brackets or rabbets 41 and 42 and a pair of upper and lower angle brackets or rabbets 43, the rabbet 41 being partially cut away at the hinges 40. The rabbets 41, 42, and 43 overlap the door opening in the trim panel 36, as best shown in FIG. 5, to serve as a door stop.

In the embodiment of the invention shown in FIGS. 1–9, two of the clamping assemblies are secured to the rabbet 41 adjacent opposite ends thereof and two of the clamping assemblies are secured to the rabbet 42 adjacent opposite ends thereof. Each screw 32 of a clamping assembly extends through the flange portion of its respective rabbet 41 or 42 which is parallel to the trim panel 36, and the head of each screw 32 is preferably countersunk in its respective rabbet, as shown most clearly in FIG. 7. The other flange portions of the rabbets 41 and 42 which are perpendicular to the trim panel 36 are provided adjacent opposite ends respectively with pairs of slots 41a and 42a each of which has a tongue portion, such as a tongue 42b (FIGS. 2, 7, 8, and 9), projecting respectively thereinto in a direction inwardly away from the trim panel 36, the slots and tongues being similar to a slot 54a and a tongue 54b shown in FIG. 14 and provided in a rabbet 54 of the embodiment of the invention shown in FIGS. 10–16.

The body 28 of each clamping assembly includes a pair of bent-over leg portions 28b apertured to selectively receive an end tongue portion 30b of the respective clamp 30. The leg portions 28b are disposed with their radial center lines substantially ninety degees apart from each other about the center of the hole 28a, and the tongue portion 30b is assembled in a leg portion 28b in accordance with the direction in which it is desired to turn the body 28 and clamp 30 for clamping, as hereinafter explained.

Respectively adjacent the leg portions 28b, the body 28 of each clamping assembly is provided with a pair of stop portions 28c selectively engageable with the respective rabbet 41 or 42 at opposite ends of the respective slot 41a or 42a to limit rotation of the body 28 and clamp 30, the disposition of the stop portions 28c being such that rotation of the body 28 and clamp 30 about the axis of the respective screw 32 is limited to substantially ninety degrees.

Substantially respectively opposite the leg portions 28b, the body 28 of each clamping assembly is provided with a pair of handle and indicating portions 28d.

The clamp 30 of each clamping assembly includes a clamping end portion 30c opposite and inwardly offset from the respective end tongue portion 30b. The clamping end portion 30c of each clamping assembly is engageable with the inner surface of a respective one of the laterally extending portions 24d of the interior trim panel 24 to clamp the exterior trim and door assembly 26 against the front of the box 22. The front of the box 22 is provided with inwardly extending flanges, including a lower flange 22b. When clamped to the box 22, the exterior trim and door assembly 26 is supported vertically by a bracket 44 welded or otherwise secured thereto and engageable with the lower flange 22b.

FIG. 2 shows the exterior trim and door assembly 26 in condition for installing on the box 22 of FIG. 1, although these two figures are drawn to different scales. In FIG. 2, the clamps 30 are disposed vertically in an unclamping or installing position. FIG. 6 shows the two left clamping assemblies in dotted lines, the clamps 30 being in unclamping position. As mentioned hereinbefore, each clamp 30 is installed selectively in one of the leg portions 28b of its respective body 28 in accordance with the desired direction of turning for clamping. Thus, in FIG. 6, the handle and indicating portions 28d point away from their respective adjacent corners of the door opening in the exterior trim panel 36. For clamping, the upper clamping assembly in FIG. 6 is turned counterclockwise, while the lower clamping assembly is turned clockwise.

FIG. 5 shows the exposed handle and indicating portions 28d of the respective clamping assemblies disposed so as to point toward their respective adjacent corners of the door opening in the exterior trim panel 36, indicating a clamped condition.

It will be understood that the spring 34 of each clamping assembly biases its respective body 28 frontwardly toward the side of the slot of its respective rabbet having the projecting tongue, such as the tongue 42b, thereon. Thus, the tongue interferes with pivotal movement of the clamping assembly unless the body 28 is depressed rearwardly to clear the respective tongue. By this means, accidental or unintentional shifting of each clamping assembly from clamping to unclamping position, or vice versa, is prevented.

FIG. 8 shows the upper left clamping assembly of FIG. 5 in clamping position, and FIG. 9 shows the same clamping assembly in unclamped position. The clamping and unclamping positions just described refer to the angular positions of the clamps 30 with respect to the axes of their respective screws 32. However, it will be understood that the respective screw 32 should be loosened before the respective clamping assembly is pivoted to an unclamping position, and that it should be tightened, when the clamping assembly is in clamping position, to dispose the clamp 30 in fully clamping position with the clamping end portion 30c in engagement with the rear surface of the respective laterally extending portion 24d, as shown in FIG. 7.

FIGS. 10–16 show another embodiment of the invention as applied to a telephone cabinet of the type installable in a wall to house telephone wire terminal blocks. Such a telephone cabinet has no interior trim panel for clamping assemblies to engage.

FIGS. 10–12 show an exterior trim and door assembly 50 for a telephone cabinet, the assembly 50 including an exterior trim panel 51 and a door or doors (not shown) similar to the door 38. FIGS. 11 and 12 show a fragmentary section of a box 52 which is similar to the box 22 and includes inwardly extending front flanges such as a left front flange 52a. Secured to the inner surface of the trim panel 51 around the door opening thereof are four angle brackets or rabbets which serve as a door stop, a left side rabbet 54 and an upper rabbet 55 being shown in FIG. 10.

A plurality of clamping assemblies may be secured to the rabbets on the trim panel 51, one clamping assembly being shown on each of the rabbets 54 and 55 in the fragmentary view of FIG. 10 and an exploded perspective view of a clamping assembly being shown in FIG. 13. Each clamping assembly includes a body 56, a clamp 58, a screw 60, and a spring 62. The body 56 of each clamping assembly is generally flat and is provided with a hole 56a for loosely receiving the screw 60. The body 56 includes an anchoring tongue 56b, and an indicating and handle portion 56c. The clamp 58 of each clamping assembly is generally L-shaped and a longer leg portion thereof is provided with a threaded hole 58a into which the screw 60 may be threaded with the spring 62 disposed on the screw 60 and between the body 56 and clamp 58. A shorter leg portion 58b of each clamp 58 is provided with a hole 58c for receiving the anchoring tongue 56b of the respective body 56. A free end portion 58d of a longer leg portion of each clamp 58 is engageable with the inner surface of its respective front flange of the box 22, as shown for example in FIG. 12, wherein the free end portion 58d engages the inner surface of the left front flange 52a.

The portions of the rabbets extending generally parallel to the trim panel 51 are provided with holes for respectively receiving the screws 60, and adjacent each clamping assembly, the portions of the rabbets extending generally perpendicular to the trim panel 51 are provided with slots having tongues projecting centrally thereinto, as previously described with respect to the rabbet 54, slot 54a, and tongue 54b best shown in FIG. 14.

The handle and indicating portion 56c of each body 56 projects through its respective slot, such as the slot 54a, and preferably each body 56 is assembled with its respective clamp 58 so that on the top rabbet 55 and the bottom rabbet (not shown), the portion 56c points toward the closer corner of the door opening in the trim panel 51 when the respective clamp 58 is in clamping position, and on the left rabbet 54 and the right rabbet (partially shown in section in FIGS. 15 and 16), the portion 56c points downward when the respective clamp 58 is in clamping position. Thus, in FIG. 10, it can be noted that the portion 56c of the body 56 of the clamping assembly shown on the left rabbet 54 points downward when the respective clamp 58 is in clamping position, and in FIG. 15, wherein the body 56 has been "flipped over" with respect to its respective clamp 58 in comparison to FIG. 10, the portion 56c of the body 56 of a clamping assembly on the right rabbet also points down when the respective clamp 58 is in clamping position.

FIG. 16 shows the clamping assembly of FIG. 15 in an unclamping position, the handle and indicating portion 56c having been pivoted to the upper end of the slot and the clamp 58 having been rotated clockwise substantially ninety degrees. It should be pointed out that each spring 62 biases the body 56 of its respective clamping assembly toward the front edge of the respective slot such as the slot 54a, so that the respective tongue such as the tongue 54b interferes with pivotal movement of the body 56 unless the body 56 is depressed rearwardly to clear the respective tongue. By this means there can be no accidental or unintentional shifting of the clamps 58 from clamping to unclamping position or vice versa.

The clamping and unclamping positions just described refer to the angular positions of the clamps 58 with respect to the axes of their respective screws 60. Thus, the clamp 58 of FIG. 11 is in clamping position with respect to its angular position about the screw 60. However, it will be understood that the screw 60 must be tightened, as in FIG. 12, to dispose the clamp 58 in fully clamping position with the portion 58d in engagement with the inner surface of the flange 52a.

I claim:

1. A front trim, door, and clamp assembly adapted to be clamped in place on an open-front box of an electrical panelboard or the like, said assembly comprising an exterior trim panel generally flat on a front side thereof but having a front-facing recessed portion with an opening therein, a door hingedly mounted adjacent an edge thereof on said exterior trim panel, said door opening from the front side of said exterior trim panel and when in a closed position substantially filling said recessed portion, extending beyond opposite edges of said opening, and being substantially flush with a portion of the front side of said exterior trim panel surrounding said recessed portion, a pair of screws mounted in said recessed portion respectively on opposite sides of said opening and covered by said door when said door is in said closed position, and a pair of clamping means mounted respectively on said screws and disposed on a rear side of said exterior trim panel.

2. An assembly as claimed in claim 1, wherein each of said clamping means also includes a body loosely mounted on the respective one of said screws on the rear side of said exterior trim panel, and a clamp hingedly mounted on the body and having a threaded hole into which the respective one of said screws is threaded.

3. An assembly as claimed in claim 1, wherein said recessed portion includes portions of a pair of rabbets having other portions secured to the rear side of said exterior trim panel respectively on opposite sides of said opening, and wherein said screws are mounted respectively in said rabbets.

4. An assembly as claimed in claim 1, wherein said recessed portion includes portions of a pair of angle brackets of generally L-shaped cross section having other portions secured to the rear side of said exterior trim panel respectively on opposite sides of said opening, each of said brackets having a portion extending generally parallel to said exterior trim panel and a portion extending generally perpendicular to said exterior trim panel and the portions of said brackets perpendicular to said exterior trim panel respectively defining opposite edges of said opening, each of said brackets having a slot in the portion thereof perpendicular to said exterior trim panel, wherein said screws are mounted respectively in said portions of said brackets parallel to said exterior trim panel, wherein each of said clamping means includes a body loosely mounted on the respective one of said screws on the rear side of said exterior trim panel and a clamp hingedly mounted on the body and having a threaded hole into which the respective one of said screws is threaded, and wherein the body of each of said clamping means includes a handle and indicating portion extending through the slot in the respective bracket.

5. An assembly as claimed in claim 2, wherein the clamp of each clamping means is mounted on the respective body selectively in either of two positions with respect thereto in accordance with a desired turning direction of the clamping means for clamping, 6. An assembly as claimed in claim 4, wherein each bracket includes a tongue extending into its respective slot from a front edge thereof, and wherein each of said clamping means also includes a spring disposed on its respective screw between its respective body and clamp and normally biasing its respective body toward the front edge of the slot of the respective bracket.

References Cited

UNITED STATES PATENTS

| 2,946,928 | 7/1960 | Slade | 317—119 |
| 3,105,173 | 9/1963 | Kingdon | 317—120 |
| 3,192,447 | 6/1965 | Kenyeres et al. | 317—119 |

ROBERT K. SCHAEFER, *Primary Examiner.*

H. O. JONES, *Assistant Examiner.*